(12) United States Patent
Michaelis et al.

(10) Patent No.: US 9,969,480 B2
(45) Date of Patent: May 15, 2018

(54) METHOD AND APPARATUS FOR CONTROL OF SAILING AND MOTOR VESSELS

(71) Applicants: Oliver Michaelis, San Diego, CA (US); Howard W Speaks, Jr., Belvedere, CA (US)

(72) Inventors: Oliver Michaelis, San Diego, CA (US); Howard W Speaks, Jr., Belvedere, CA (US)

( * ) Notice: Subject to any disclaimer, the term of this patent is extended or adjusted under 35 U.S.C. 154(b) by 0 days. days.

(21) Appl. No.: 15/369,745

(22) Filed: Dec. 5, 2016

(65) Prior Publication Data
US 2017/0158303 A1 Jun. 8, 2017

Related U.S. Application Data

(60) Provisional application No. 62/262,646, filed on Dec. 3, 2015.

(51) Int. Cl.
| | |
|---|---|
| *B63J 99/00* | (2009.01) |
| *A62C 27/00* | (2006.01) |
| *B63H 25/04* | (2006.01) |
| *G06K 9/00* | (2006.01) |
| *G06K 9/62* | (2006.01) |
| *B63H 25/02* | (2006.01) |

(52) U.S. Cl.
CPC .............. *B63J 99/00* (2013.01); *B63H 25/04* (2013.01); *G06K 9/0061* (2013.01); *G06K 9/00362* (2013.01); *G06K 9/6201* (2013.01); *B63H 2025/026* (2013.01); *B63H 2025/028* (2013.01); *B63J 2099/006* (2013.01)

(58) Field of Classification Search
CPC . B63J 99/00; A62C 27/00; H04N 7/18; B60R 1/006; B60R 25/04; B60R 25/2009; B62B 5/0073; G07C 9/00174; B62D 6/001; B60W 30/17; F16H 61/18; B62K 11/14; B60N 2/002; B60T 7/06; G06F 3/017
See application file for complete search history.

(56) References Cited

U.S. PATENT DOCUMENTS

| | | | |
|---|---|---|---|
| 2005/0023067 A1* | 2/2005 | Ledford | B62K 11/14 180/315 |
| 2006/0036358 A1* | 2/2006 | Hale | B60R 25/2009 701/45 |
| 2006/0285725 A1* | 12/2006 | Recce | B60R 25/04 382/115 |

(Continued)

*Primary Examiner* — Yuri Kan
(74) *Attorney, Agent, or Firm* — Thibault Patent Group

(57) ABSTRACT

Various embodiments for measuring and interpreting a vessel operator's intent and control inputs are disclosed. Various stations on a vessel comprise user control devices to receive vessel control commands from a vessel operator in conjunction with associated transducer information capturing physical conditions or attributes of the operator at, or proximate to, one of the user control devices. A processor determines whether the vessel control command was deliberate, based on the physical condition or the attribute captured by the transducer. Upon determination of a valid user control input, the processor optionally performs transformation of the user vessel control command based on an operator identity and vessel environmental factors, and then sends a corresponding control command to one or more vessel physical control devices, such as a rudder or an engine.

21 Claims, 6 Drawing Sheets

(56) References Cited

U.S. PATENT DOCUMENTS

| | | | | |
|---|---|---|---|---|
| 2008/0058155 A1* | 3/2008 | Sinojima | ............... | F16H 61/18 |
| | | | | 477/50 |
| 2008/0109120 A1* | 5/2008 | Sawamoto | ............ | B60W 30/17 |
| | | | | 701/1 |
| 2009/0127015 A1* | 5/2009 | Van Saanen | ............... | B60T 7/06 |
| | | | | 180/271 |
| 2011/0178680 A1* | 7/2011 | Kato | ..................... | B60N 2/002 |
| | | | | 701/41 |
| 2012/0089301 A1* | 4/2012 | Koizumi | ............... | B62D 6/001 |
| | | | | 701/42 |
| 2013/0107027 A1* | 5/2013 | Muellhaeuser | ........... | H04N 7/18 |
| | | | | 348/77 |
| 2014/0055236 A1* | 2/2014 | Kuebler | ............. | G07C 9/00174 |
| | | | | 340/5.61 |
| 2015/0066274 A1* | 3/2015 | Hijikata | ................ | B62B 5/0073 |
| | | | | 701/22 |
| 2016/0304051 A1* | 10/2016 | Archer | ................... | A62C 27/00 |
| 2017/0060234 A1* | 3/2017 | Sung | ..................... | B60R 1/006 |
| 2017/0108935 A1* | 4/2017 | Ricci | ..................... | G06F 3/017 |

* cited by examiner

METHOD AND APPARATUS FOR CONTROL
OF SAILING AND MOTOR VESSELS

CLAIM OF PRIORITY

This application claims the benefit of U.S. provisional application Ser. No. 62/262,646 filed on Dec. 3, 2015.

BACKGROUND

Field of Use

The present application relates to the field boats and yachts, and more particularly with providing control of such vessels.

Description of the Related Art

The development of electronic and fly-by-wire controls for marine applications has significantly simplified the design of medium to large vessels that utilize multi-location input controls. As a result, a significant percentage of newer designs have incorporated secondary control stations separate from a main pilot house and have even introduced custom, handheld remote controls for controls relevant to specific tasks such as docking the vessel.

The introduction of additional secondary control stations, however, has led to a different set of issues. While, traditionally, pilot stations were physically separated from common areas of vessels, these secondary stations are often adjacent to places passengers are commonly found. As a result, accidental operation of such controls by somebody other than authorized vessel operators is much more likely than in a traditional layout. Furthermore, when switching between control locations, vessel operators generally must explicitly change the active control status of the stations involved as well. So, while the introduction of task-specific secondary control stations is a significant improvement for the efficiency of the operator of the vessel, the important issue of unauthorized or unintentional use needs to be resolved.

SUMMARY

Sailing and motor boats or yachts typically have multiple control elements that provide guidance and control of the vessel, such as throttle controls, gear selection devices, electric or hydraulic thrusters, and electric or hydraulic winches, to name some common examples. The control elements used today comprise mechanisms such as push-buttons, D-pads, levers, switches, touch screen controls, wheels, and multi-directional levers such as joysticks. Even mid-sized vessels often have more than one set of such control elements, and hence pose a risk of unintentional actuation of a control element when the operator is working from a secondary or tertiary station on the vessel. With increased vessel size and the increased skill set required to maneuver such vessels safely, restricting the operation of vessel control elements to personnel qualified is a highly desirable function, which so far is commonly solved by simply limiting physical access. This is not always a practical solution and also does not provide a reasonable level of security given the value of such vessels.

Vessels with multiple control stations also require a mechanism to select an active control station, which may change during a particular maneuver. For example, as a vessel enters a harbor, the main operator may steer from the main bridge to have full view of traffic around the vessel, and as the vessel approaches its docking space the operator may switch to a secondary control station on either side of the vessel to align properly against the dock. Such handoff is commonly implemented by requiring all unused control stations to have input controls in a neutral position, or explicit activation via e.g. a dedicated control button. The concept introduced herein vastly simplifies the selection of the active control station as the determination of an intentional operation also inherently defines that location as the active control station.

Embodiments of the present invention also prevent unintentional control of a water-based vessel. In this embodiment, when a vessel control command is entered by a vessel operator into a user control device, one or more transducers additionally provides digital signals to a processor, representing a physical condition or attribute at or proximate to the user control device. Based on the digital signals from the one or more transducers, the processor determines whether the vessel control command was deliberate or not. If the processor determines that the vessel control command was deliberate, the processor may provide a control signal to one or more physical vessel control devices that controls an operation of the vessel.

BRIEF DESCRIPTION OF THE DRAWINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Embodiments of the present invention comprise systems, methods, and apparatus for managing multiple control stations of a vessel by differentiating intentional and/or authorized input to such controls and hence discerning valid from invalid control commands. Each control station comprises one or more user control devices capable of translating a human user interaction into an electronic control signal, and a monitoring device or transducer capable of measuring a certain attribute that is correlated to an operator's degree of intent of performing such user interaction. These control signals are then processed to determine the type and validity of the interaction and its correct interpretation into corresponding control commands to vessel physical control devices that cause a movement of the vessel or operation of equipment on the vessel.

Figure 1:
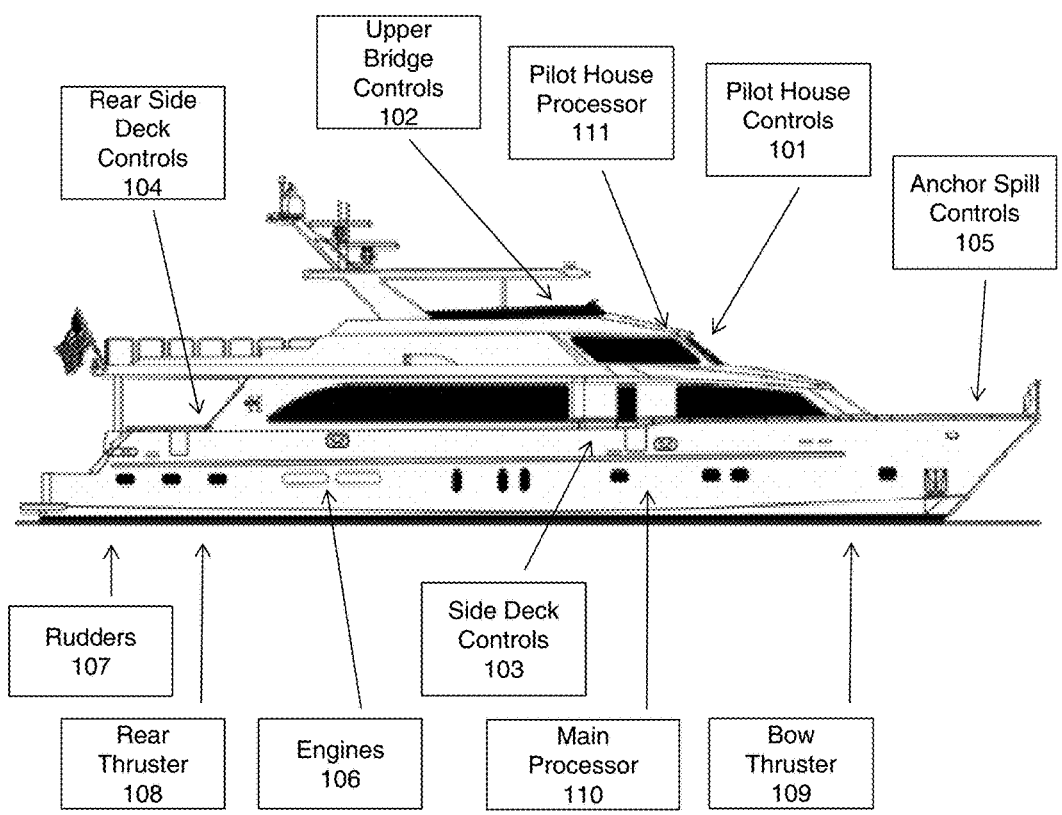
FIG. 1 illustrates one embodiment of a typical set of user and vessel control elements found on a motor yacht. The illustration shows two primary user control stations with pilot house controls and upper bridge controls, as well as four secondary user control stations located amidships and astern on either side. The typical physical control devices of a vessel that are controlled by such user controls comprise the main engines and rudder, as well as supportive systems for docking and mooring, such as bow and stern thrusters and one or more anchor spills.

FIG. 1 illustrates one embodiment of a typical arrangement of user control devices, processors, and vessel physical control devices on a larger motor yacht. A main control station 101 houses user control devices capable of controlling one or more vessel physical control devices, such as the main engines 106, the rudders 107, and the rear and bow thrusters 107 and 109. The yacht separately supports main cruising controls for the engines 106 and rudders 107 at a secondary upper bridge 102. In this embodiment, there are four further control stations supporting specific tasks when docking the vessel—a rear side deck control 104 and a side deck control 103 on either side of the vessel. Each of the side deck control stations allows for control of the engines 106 and the rear and bow thrusters 107 and 109. All stations 101, 102, 103, and 104 comprise both user control devices as well as corresponding transducers to interpret operator intent of using said control devices. The details of the interoperation of user input devices, transducers, and processors to determine operator intent and valid commands are further described below. Due to the complexity of a comprehensive main control station 101, the user input devices and transducers located in main control station 101 typically provide respective digital representations of user inputs and attributes measuring degrees of operator intent to a pilot house processor 111, which may aggregate such data to represent the controls and transducers located in main control station 101 to the vessel's central processing unit 110 as a single subsystem. In one embodiment, stations 102, 103, and 104 each transmit their respective digital representations of user interactions from user input devices and corresponding attributes measuring degree of operator intent from related transducers directly to central processing unit 110. The vessel physical control devices—engines 106, rudders 107, rear and bow thrusters 108 and 109—receive their control commands either from the central processing unit 110 or the pilot house central processing unit 111. Both central processing units 110 and 111 replicate the logic to correlate the operator's interaction with a user interface as reported by a user control device and the corresponding degree of intent as reported by the related transducer. Between the two central processing units 110 and 111, central processing unit 110 generally has priority, and pilot processor 111 generally can only issue control commands if central processing unit 110 is malfunctioning. The determination of a malfunction of the central processing unit 110 can either occur based on system operational metrics for the responsiveness and correct behavior of central processing unit 110, or via a separate manual operator initiated change of control between central processing units 110 and 111. Upon receiving a transmission from a user control device and a corresponding transducer, central processing unit 110 determines whether the reported degree of intent is sufficient to declare the reported user control device input as a valid command. If a valid command is determined, central processing unit 110 transmits the corresponding control command to a respective vessel physical control device.

Figure 2:
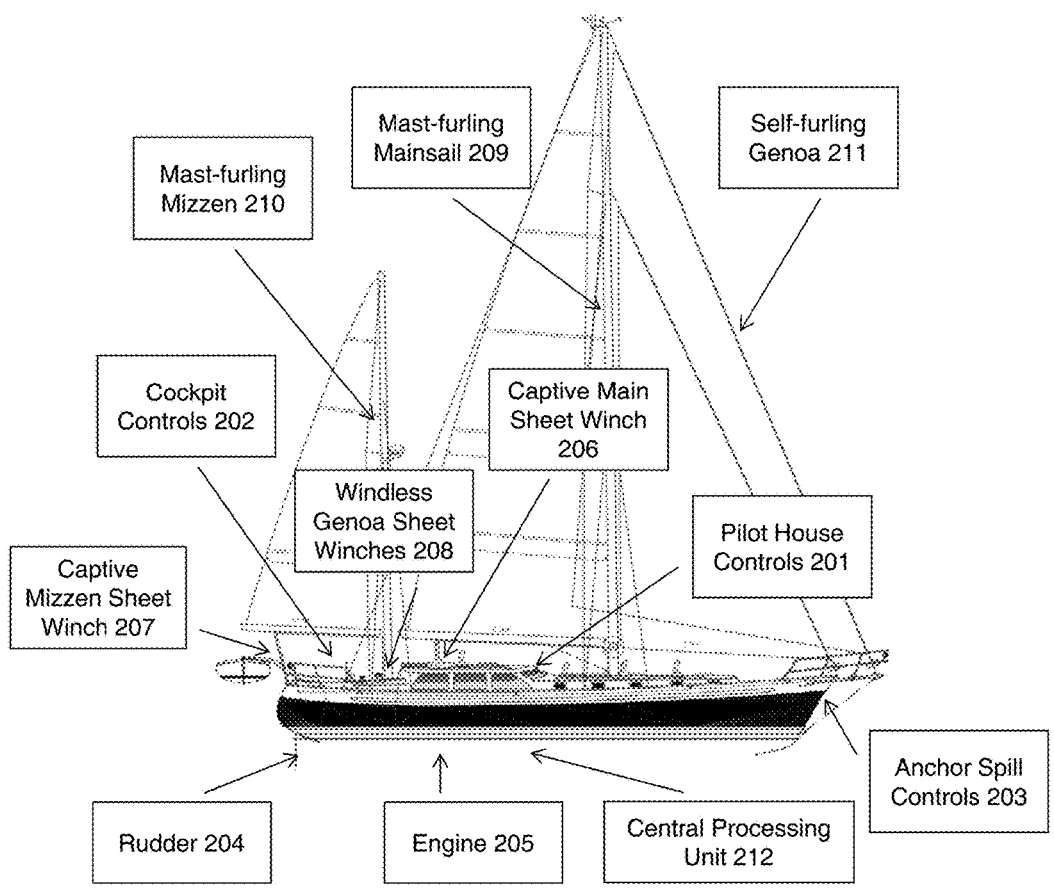
FIG. 2 illustrates one embodiment of a typical set of user and vessel control elements found on a sailing yacht. The illustration shows two primary user control stations with cockpit controls and pilot house controls. The typical physical control devices of a vessel that are controlled by such user controls comprise winches use to control main, mizzen, and foresails, as well as the main engine and rudder, and furling systems to stow main and mizzen sails into their respective masts and the foresails onto their respective head stays. Finally a typical arrangement also comprises an anchor spill on the foredeck.

FIG. 2 is a functional block diagram of one embodiment of user control devices, a processor, and vessel physical control devices on a mid-size sailing yacht. A main control station 201 houses user control devices capable of controlling the vessel physical control devices, such as the rudder 204, the main engine 205, the sheet winches for the main sail 206, mizzen 207, genoa 208, and the sail furling systems for main 209, mizzen 210, and genoa 211. A second set of controls is available in the cockpit 202, which replicates the controls of station 201. In this arrangement, the user control devices and transducers provide their respective digital representations of user interactions and measurements of degree of intent to a single processor 212. Upon receiving a transmission from a user control device and a corresponding transducer, central processing unit 212 determines whether the reported degree of intent is sufficient to declare the reported user control device input as a valid command. If a valid command is determined, processor 212 provides the corresponding control command to the respective vessel physical control device.

Each user control device generally comprises a user interface capable of translating a human interaction with the user interface into electronic digital representations of the interaction. Such interaction may comprise visual, audio, touch, movement, or any combination thereof, and detected via a camera, microphone, touch sensor(s), or a haptic element such as a switch, lever, wheel, or joystick. The user control device represents such user interactions as electrical digital signals that are transmitted to a processor for interpretation. Such digital signals are in form of a binary representation of the interaction that additionally may identify a particular user control device.

One or more of the user control devices may be used in conjunction with one or more corresponding transducers to determine the operator's intent to control the vessel while performing the interaction described above. Transducers may comprise a camera, a microphone, a touch sensor(s), a haptic element such as a switch or lever, a pressure sensor or a weight sensor. Each transducer type is capable of measuring specific attributes of an operator correlating to the operator's degree of intent and transmitting such attributes in the form of a digital electric representation to be further incorporated into the interpretation of an overall user interaction by a central processing unit, such as central processing unit 110 or 212. A transducer may transmit a single representation of such attributes to the processor, or may combine several attributes locally into a single representation before providing it to a central processing unit. In either case, the digital representation of said attributes may also uniquely identify the transducer to the central processing unit.

In one embodiment, a transducer comprises one or more cameras that are used to provide digital images or video of an area proximate to the user control device to a processor, and the processor determines a distance between a corresponding user control device user interface and the operator's body. The transducer uses this distance to represent a degree of intent. The processor uses well-known techniques in the art to determine this distance using digital representations from the one or more cameras. When the processor determines that the operator's body is in close proximity to the user interface, the processor determines that any corresponding command from the user interface is valid, and the command is provided to one or more vessel physical control devices or otherwise authorized as a valid command. When the operator's body is determined to be a distance that is not in proximity to the user interface, any commands received from the user interface are ignored. "Close proximity", in one embodiment, means that an operator's body is within 12 inches of the user interface.

In another embodiment, the transducer comprises one or more cameras that are used to provide digital images or video of an operator's body posture to the processor. Based on geometrical metrics describing the operator's posture towards the user interface, the processor generates a degree of intent. For example, a camera may be positioned to view the user interface from one side, thereby capturing images of an operator from a side view. The processor, then, may use the images to determine whether an operator is leaning forward towards the user interface when a command from the user interface is received by the processor by comparing a digital representation an approximation of the operator's posture with a exemplary posture profile stored in a memory associated with the processor. Such determination by the processor of an operator's posture is well known in the art. When the processor determines that an operator is leaning towards the user interface by more than a predetermined amount, the processor forwards any commands received from the user interface to one or more vessel physical control devices or otherwise authorized as a valid command.

In a similar embodiment, the transducer again comprises one or more cameras, and the one or more cameras provide digital images or video of the area proximate to the user control device to the processor for the processor to determine an operator's body's rotational angle relative to the user interface to represent a degree of intent. For example, a camera could be mounted looking down on the user control device and provide digital images to the processor, and the processor uses the digital images to determine whether the operator is facing the user interface. This may be determined by setting a minimum and a maximum body position angle, such as +10 degrees and −10 degrees from the perpendicular to the user interface. When the processor determines that the operator's body's rotational angle relative to the user interface is within the minimum and maximum position angles, the processor determines that any corresponding command from the user interface is valid, and the command is provided to one or more vessel physical control devices or otherwise authorized as a valid command.

In another embodiment, the transducer comprises one or more cameras, and the one or more cameras provide digital images or video to the processor for the processor to identify an operator's body part making contact with the user interface to represent a degree of intent. When the processor determines that the body part is a finger or a hand, the processor provides any associated commands from the user interface to one or more vessel physical control devices. Determining a body part by the processor from digital images or video is well-known in the art. When the processor determines that a hand or finger is not in contact with the user interface, but that some other body part is (such as the operator's backside), the processor ignores any commands received from the user interface, as the processor interprets this as an unintended act by the operator.

In another embodiment the transducer uses one or more cameras to identify the operator via detectable visual body features such as facial recognition. The processor compares facial characteristics of an operator to one or more sets of facial characteristics stored in a memory representing authorized vessel operators. When an authorized vessel operator is identified, the processor may retrieve a set of authorizations, limitations or other privileges or restrictions pre-stored in an operator profile in the memory for each vessel operator. Based on a valid match between the facial characteristics provided by the one or more cameras and one of the authorized facial characteristic sets stored in the memory, the processor may allow a vessel control command received at or near the time the processor identified the vessel operator to be provided to one or more physical vessel control devices. The processor may further restrict or allow certain vessel control commands based on the privileges or restrictions in the identified vessel operator's stored profile.

In yet another embodiment, the transducer comprises one or more cameras, and the one or more cameras provide digital images or video to the processor for the processor to identify an operator's eyes' gaze direction. The processor calculates the angle between the operator's gaze based on the operator's eyes towards the user interface. When the operator's eyes are determined to be within a predetermined angle of a hypothetical ray from the user interface surface, the processor assigns a high degree of intent of any commands received from the user interface at that time, and a vessel control command received at or near in time to the determination is provided to one or more physical vessel control devices or otherwise authorized as a valid command.

In yet another embodiment, the transducer comprises one or more microphones to detect audible signals, and the one or more microphones send digital representations of audio signals to the processor, which determines whether the digital audio signals represent speech. For example, a predefined word or phrase may be stored in a memory associated with the processor, and the processor compares the digital audio signals to the predefined word or phrase to determine an operator's intent to control a vessel. For example, if the phrase "Roger That" has been predefined as a phrase to enable the user control device, then the processor evaluates audio signals from the one or more microphones to determine whether the operator uttered the phrase "Roger That". If so, any commands received by the processor form the user interface at or near this time are forwarded to one or more vessel physical control devices or otherwise authorized as a valid command.

In another embodiment the transducer comprises one or more microphones that provides electronic signals representative of detected audible signals, for identifying a vessel operator's voice based on a comparison of received voice information from the one or more microphones to sample voice metrics stored in a memory for each authorized vessel operator. The processor may retrieve a set of authorizations, limitations or other privileges or restrictions pre-stored in an operator profile in the memory when an authorized vessel operator has been identified. Further, the processor may allow a vessel control command received at or near the time the processor identified the vessel operator to be provided to one or more physical vessel control devices. The processor may further restrict or allow certain vessel control commands based on the privileges or restrictions in the identified vessel operator's stored profile.

In yet still another embodiment, the transducer comprises a touch sensor to determine an operator's intention to control a vessel. The touch sensor is located in proximity of the user interface and requires a positive user action in addition to the operator's interaction with the user interface, e.g. a finger or a palm to be placed on the touch sensor in a static fashion. The transducer provides signals to the processor, and the processor determines whether an operator intends to operate the vessel when the signals from the transducer indicate that an operator has physically interacted with the touch sensor.

The processor may additionally measure the time that the touch sensor has been engaged to determine an operator's intent. For example, the processor could determine that a positive touch on the touch sensor for less than 1 second does not represent an intention by an operator to control the vessel. When the processor determines that the operator is touching the transducer, the processor determines that any corresponding command from the user interface is valid, and the command is provided to one or more vessel physical control devices or otherwise authorized as a valid command.

In another embodiment, the transducer comprises a touch input element capable of fingerprint sensing used to identify the operator based on a comparison of a received fingerprint scan from the touch input element to sample fingerprints stored in a memory for each authorized vessel operator. The processor may retrieve a set of authorizations, limitations or other privileges or restrictions pre-stored in an operator profile in the memory when an authorized vessel operator has been identified. Further, the processor may allow a vessel control command received at or near the time the processor identified the vessel operator to be provided to one or more physical vessel control devices. The processor may further restrict or allow certain vessel control commands based on the privileges or restrictions in the identified vessel operator's stored profile.

In another embodiment the transducer uses a touch sensor element that identifies tap or moving gestures such as swipes of flicks with one or more fingers. The transducer uses the specific gesture performed to represent a degree of intent. For example, the transducer and the associated user control device are two separate elements in proximity to each other. The user may be required to perform a specific gesture on the touch sensor, such as a swipe or flick, to enable subsequent vessel control commands on the user control device. Alternatively, the transducer and the user control device may be fully integrated and share a common touch sensor, whereby the gesture performed by the user is measured by the transducer for the purpose of identifying a valid gesture, and measured by the user control device for the purpose of interpreting vessel control commands. The processor subsequently combines these measurements to determine the validity of the touch-based user input command.

In another embodiment, the transducer comprises a touch sensor integrated into the surface of a haptic user interface element such as a joystick. The touch sensor allows for positive acknowledgement of the operator's hand in a proper actuating position; either by one or more sensor elements located on the joystick grip, or a continuous touch sensor wrapped around the grip. Both arrangements can be used to detect whether the operator's hand is gripping the joystick handle or merely pushing it. Signals from the sensors are provided to the processor, where the processor determines whether the haptic user interface is being used in a manner that denotes intentional operation. When the processor determines that the operator's hand is in a proper actuating position, based on the signals received from the transducer, the processor determines that any corresponding command from the user interface is valid, and the command is provided to one or more vessel physical control devices or otherwise authorized as a valid command.

In another embodiment, the transducer comprises one or more touch sensors located on a task-specific shaped haptic user interface element such as a lever or a throttle. The touch sensor(s) send signals to the processor, where the processor determines an amount (i.e., pressure, open/close, etc.) and/or duration of touch on the one or more sensors located on surface areas that are touched naturally during an intentional user interaction, such as the opposing sides of a throttle or gear control, to determine whether control signals received from the task-specific shaped haptic user interface are intentional. When the processor determines that the haptic user interface is being touched in a way that denotes deliberate control of the haptic user interface, the processor determines that any corresponding command from the user interface is valid, and the command is provided to one or more vessel physical control devices or otherwise authorized as a valid command.

In one embodiment, the transducer comprises one or more haptic sensors, such as a switch, to establish a proper actuating position of the operator's hand on or around a haptic user interface element such as e.g. a joystick with one or more such haptic switches embedded in its gripping surface. The transducer sends electronic signals to the processor, and the processor determines whether control signals from the haptic user interface element are intentional, based on whether the haptic sensor(s) are depressed and/or whether the haptic sensor(s) have been depressed at least a predetermined time period (such as two seconds), thereby establishing the operator's grip on the user interface element. When the processor determines that the haptic user interface element is being gripped by an operator, the processor determines that any corresponding command from the user interface is valid, and the command is provided to one or more vessel physical control devices or otherwise authorized as a valid command.

In another embodiment, the transducer comprises one or more haptic sensors such as a switch to establish a proper actuating position of the operator's hand on or around a task-specific shaped haptic user interface element such as a lever or a throttle, e.g. a switch embedded in the underside of said user interface element. The one or more haptic sensors send electronic signals to the processor, and the processor determines whether control signals from the haptic user interface element are intentional, based on whether the one or more haptic sensors have been depressed and/or whether the haptic sensor(s) have been depressed at least a predetermined time period (such as two seconds), thereby establishing the operator's grip on the user interface element.

In one embodiment, the transducer comprises one or more pressure sensor elements to determine an operator's intent. A haptic user interface element such as a joystick, lever, or switch employing a force feedback mechanism is used to establish a pressure threshold that needs to be exceeded to establish an intentional movement of the user interface element. The transducer provides electronic signals to the processor, and the processor determines, from the electronic signals, whether a sufficient amount of pressure has been applied to the user interface element by comparing the force represented by the electronic signal to a predetermined pressure threshold stored in a memory associated with the processor. When the processor determines that the haptic user interface element is being operated with a force greater than the predetermined pressure, the processor determines that any corresponding command from the user interface is valid, and the command is provided to one or more vessel physical control devices or otherwise authorized as a valid command.

In another embodiment, the transducer comprises one or more pressure sensor elements to determine the operator's intent to operate a vessel. A haptic user interface element such as a joystick or task-specific shaped haptic user interface element employ embedded one or more pressure sensors to establish positive acknowledgement of the operator's grip on or around the user interface element. A processor compares the pressure exerted against each of the one or more sensors and compares these readings to readings stored in a memory, which indicate a minimum pressure for each of the sensors, signifying an intentional gripping of the user interface element. When the pressure measured at one or more of the one or more pressure sensors exceed the pressure(s) stored in the memory, the processor determines that any corresponding vessel control command from the user interface is valid, and the command is provided to one or more vessel physical control devices or otherwise authorized as a valid command.

In one embodiment, the transducer comprises one or more weight sensors to establish the operator's presence at a natural operating position in front of a user interface. For example, a pilot chair in front of a user interface may comprise one or more weight sensors embedded in the seating area to establish a presence of the operator in front of the user interface. In one embodiment, one or more weight sensors may be installed on or under a surface of one or both armrests to determine when an operator is seated in the chair. The transducer(s) provide signals to the processor and the processor uses the signals to compare the weight reported by the sensors to one or more predetermined weight thresholds stored in a memory associated with the processor. For example, a minimum weight threshold may be set for the seating portion of the chair to be 100 lbs, while an armrest minimum weight threshold could be set to three pounds. When the processor determines that the weight(s) reported by the sensor(s) exceed the minimum weight(s), the processor determines that any corresponding command from the user interface is valid, and the command is provided to one or more vessel physical control devices or otherwise authorized as a valid command.

In another embodiment, one or more weight sensors are installed into or under the flooring proximate to the user interface to establish the operator's presence at a natural operating position for the respective user interface. The flooring in front of a user interface such as e.g. a steering wheel or throttle control has one or more weight sensors embedded to establish a proper stance of the operator in relation to the corresponding controls. In one embodiment, at least two weight sensors are used, each for measuring a weight associated with a respective foot of an operator when standing in front of a user interface. The transducers provide signals to the processor and the processor uses the signals to compare the weight reported by the sensors to one or more predetermined weight thresholds stored in a memory associated with the processor. In the example of using at least two weight sensors, one for each foot, a minimum weight threshold may be set to be 50 lbs. When the processor determines that the weights reported by the sensors each exceed 50 pounds, the processor determines that an operator is standing in front of the user interface, that any corresponding commands from the user interface are valid, and the commands are provided to one or more vessel physical control devices or otherwise authorized as a valid command.

In one embodiment, the processor measures intervals of time between receipt of vessel operation commands from one user control device and receipt of other vessel operation commands from another user control device. Based on the frequency of actuations of a single user control device and/or the duration between two actuations of different user control devices compared to the time required to travel between such two user control devices, the processor uses these time-based metrics to determine a degree of intent to control operation of the vessel. For example, when the processor receives three vessel operation commands from a first user control device within 10 seconds, this may indicate an intentional use of a user control device. Similarly, a time could be predetermined and stored in a memory associated with the processor representative of a time required for an operator to travel from one set of user control devices to another set of user control devices, i.e., when an operator walks from main pilot house controls 101 to upper bridge controls 102. The processor measures the time from when the last valid command was received from a first user control device until the time that a new command is received from a second user control device and compares the elapsed time to the time stored in memory. If the elapsed time is equal to the predetermined time, within a given margin of time, for example, +/−30 seconds, the processor determines that an operator has moved from one user control device to another user control device and the commands received from the second user control device are provided to one or more vessel physical control devices. It should be understood that the timing information may be received directly from user control devices, or may be received from the central processing unit 110 based on transmissions of digital representations of user interactions received by said processor. Further, such transducer functionality may be fully integrated into the central processing unit 110.

Figure 3:
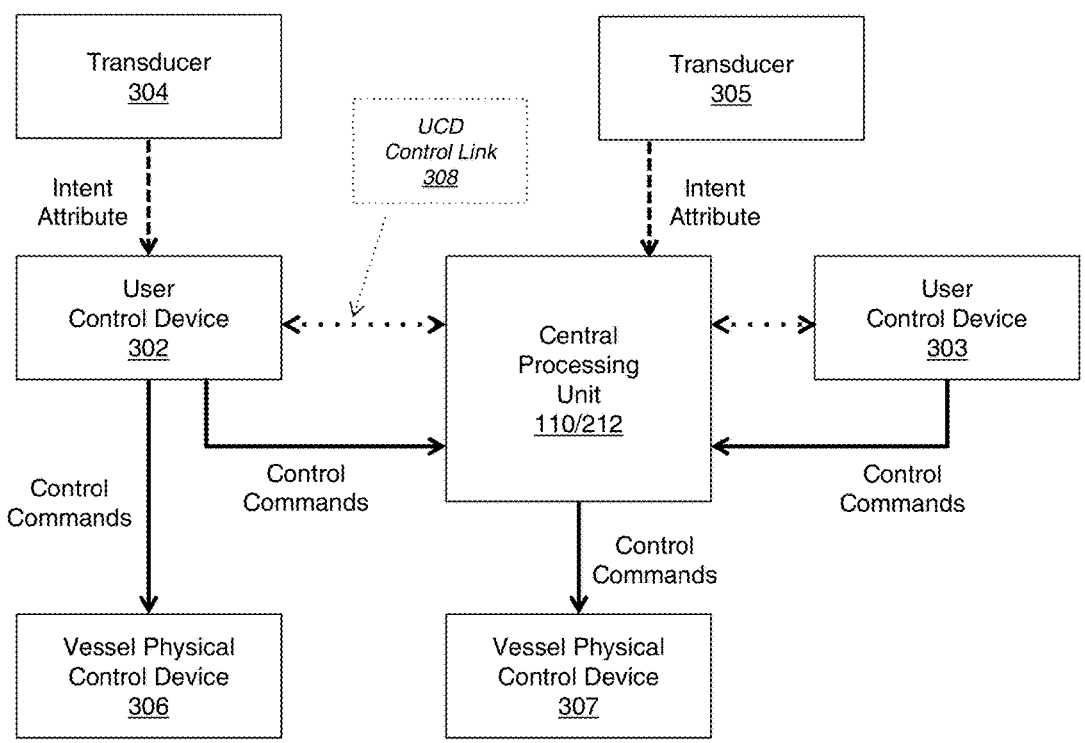
FIG. 3 is a functional block diagram of one embodiment of a system for preventing unintentional operation of a water-based vessel.

FIG. 3 is a functional block diagram of one embodiment of a system for preventing unintentional operation of a water-based vessel, comprising user control devices 302 and 303, transducers 304 and 305, central processing unit 110/212, and vessel physical control devices 306 and 307. It should be understood that the functional blocks shown in FIG. 3 may be connected to one another in a variety of ways, and that not all functional blocks necessary for operation of such system are shown (such as a power supply) for purposes of clarity. Furthermore, an actual system implementation may consist of any number of user input devices and transducers, which transmit digital representations of user interactions and of attributes measuring a degree of operator intent to one or more processors, which in turn transmit control commands to any number of vessel physical control devices.

Central processing unit 110/212 is configured to receive digital representations of vessel control commands from user control devices 302 and 303, and digital representations of one or more "intent attributes" (i.e., operator body position, body angle, gaze, weight, etc.) from transducers 304 and 305. Based on the data received, central processing unit 110/212 may send configuration commands back to user control devices 302 and 303 via a control link 308 to enable, disable, or change specific functionality embedded in user control devices 302 and 303. Based on the data received, central processing unit 110/212 may further determine whether a user interaction performed on a user control device 302 or 303 was actually intended by the operator. Central processing unit 110/212 correlates commands received from user control device 302 or 303 with the digital representations received from a corresponding transducer 304 or 305 to determine a degree of intent of an operator and hence the validity of the received command. Once a user interaction is determined valid, central processing unit 110/212 sends a corresponding control command to one or more vessel physical control devices 306 and/or 307. It should be understood that a user interaction performed on a single user control device may result in a coordinated operation of multiple vessel physical control devices. For example, a position-hold function triggered on a user control device may cause central processing unit 110/212 to actuate main engines, stern, and bow thrusters concurrently to perform such function.

In this embodiment, user control device 302 is physically integrated with its corresponding transducer 304. The user control device 302 provides digital commands of an operator's intent to control a vessel to central processing unit 110/212 and also provides digital representations of transducer data from transducer 304 to central processing unit 110/212. In one embodiment, the digital data from user control device 302 and transducer 304 are combined and provided to central processing unit 110/212. In this embodiment, said data may uniquely identify user control device 302 and transducer 304 by association, or said data may simply combine the individual digital representations of user control device 302 and transducer 304, each containing their respective, unique identifiers into a single transmission to central processing unit 110/212. An example of this arrangement is a joystick as user control device 302 with integrated touch sensors around the grip surface area used as transducer 304 to measure the amount of touch from the operator's hand as an attribute.

In this embodiment, user control device 303 and transducer 305 are two separate elements of the overall system, with independent connections to central processing unit 110/212. Central processing unit 110/212 receives electronic data from a user interface of user control device 303 with digital representations of user commands; and separately, data from transducer 305 with digital representations of one or more attributes related to a degree of operator intent when performing user interaction with user control device 303. Based on its configuration, central processing unit 110/212 then correlates the two data transmissions to determine the validity of the user interaction. Such correlation may be based on the concurrency of the two transmissions received from 303 and 305, or based on a specific order required to establish said validity. An example of this arrangement is a touch screen control panel as user control device 303, and a separate camera used as a gaze detector, representing transducer 305, wherein central processing unit 110/212 determines whether a command received from the touch screen if valid only when it is received after a signal from the camera is received, and central processing unit 110/212 determines that the operator is looking at the touch screen from the signal from the camera.

Central processing unit 110/212 may comprise separate control link 308 used to provide commands to user control devices 302 and 303, for example, to enable, disable, or change specific functionality within user control devices 302 and 303. Central processing unit 110/212 may disable either user control device 302 or 303 altogether based on their task-appropriateness for a specific context. For example, if user control device 302 is a port-side deck control and user control device 303 is a starboard side deck control, and central processing unit 110/212 has determined from a GPS-based transducer that the a starboard side of the vessel is within a predetermined distance from a dock, central processing unit 110/212 may disable user control device 302 altogether, as user control device 303 would typically be the only device of this type that can assist the operator for this specific task.

Central processing unit 110/212 may also use control link 308 to configure user control devices 302 and 303 for a specific task. For example, if user control devices 302 and 303 are engine throttle controls at two different locations on a vessel, central processing unit 110/212 may decide, based on input from a GPS based transducer, to keep both devices 302 and 303 enabled, but apply a scaling factor of 0.5 onto the digital representation of the throttle position to limit engine output to 50% within confined areas such as a marina.

It should be understood that in other embodiments, more than one transducer may be associated with any user control device. Based on the transducer types available for a specific user control device, central processing unit 110/212 may further differentiate the configuration of a user control device based on a context of a particular user interaction. For example, based on a location of a vessel and environmental factors such as wind and sea states, central processing unit 110/212 may impose actuation limits directly on user control device 303 or during interpretation of digital representations of user interactions received from device 303. In a case where central processing unit 110/212 is able to identify an operator using signals received from the one or more transducers, central processing unit 110/212 may be configured to apply a set of functional rules specific to a custom profile stored in a memory associated with central processing unit 110/212 according to the operator's preferences, level of experience, or authorized scope of operation.

Based on correlating digital representations of user interactions from user control devices 302 and 303, and of degrees of intent from their respective transducers 304 and 305, central processing unit 110/212 may determine the validity of user interactions on a per interaction basis. In case a digital representation of both a user interaction and a degree of intent is received by central processing unit 110/212 from both device-transducer combinations 302/304 and 303/305 concurrently or within a predefined window of time, and both user interaction representations would result in a control command to the same vessel physical control device, such as vessel physical control device 307, central processing unit 110/212 uses the signals from transducers 304 and 305 to establish which user interaction has priority. This priority determination may be based on central processing unit 110/212 determining one user control device command as invalid based on that user control device's corresponding transducer data alone, or prioritizing the user interaction associated with a larger degree of intent based on the relative values of the signals transmitted by their respective transducers.

Central processing unit 110/212 uses the data received from transducer 305 to determine whether the operator's user interaction was intentional and hence a valid input, as explained in the numerous embodiments above. Once central processing unit 110/212 determines an input to be valid, it may send a corresponding control command to an associated vessel physical control device, depending on the particular command received. Based on an identity of user control device 303, processor 110/212 may apply a data transformation—e.g. a scaling operation, bit shifting operation, or a remapping operation—between the data representing the user interaction received from user control device 303 and the data representing the control command to be sent to a vessel physical control device for the purpose of compatibility between device formats or protocols.

In one embodiment, user control device 302 can directly send control commands to vessel physical control device 306. For user interactions resulting in control commands solely to device 306, user control device 302 may independently determine a degree of operator intent based on input received from transducer 304 and, hence, the validity of the user interaction based on attributes determined by a processor within user control device 302.

Central processing unit 110/212 may send configuration information to user control device 302 to establish rules for interpreting attributes provided by transducer 304, based on which user control device 302 determines the validity of user interactions performed on device 302. Such configuration of device 302 by central processing unit 110/212 may be caused by system initialization, or dynamically based on the current context of the overall system. For example, central processing unit 110/212 may enable user control device 302 to directly control vessel physical control device 306 if no other potentially conflicting user control devices are currently enabled by central processing unit 110/212.

In one embodiment, user control device 302 may send the digital representations of a control command and the corresponding attributes for determining a degree of operator intent to central processing unit 110/212 to request permission to transmit the control command to vessel physical control device 306. Upon receiving the request, central processing unit 110/212 uses the attributes provided by transducer 304 to determine the validity of the user interaction and responds with either a confirmation or denial to user control device 302. Based on the response from central processing unit 110/212 user control device 302 provides a corresponding control command directly to vessel physical control device 306.

In one embodiment, user control device 302 is configured to request permission from central processing unit 110/212 before providing control commands to any vessel physical control devices. In the case of a malfunction of central processing unit 110/212, user control device 302 may switch to an override mode, eliminating its dependency on central processing unit 110/212 and allowing device 302 to control vessel physical control device 306 directly. The determination of a malfunction of central processing unit 110/212 can either occur based on system operational metrics for the responsiveness and correct behavior of central processing unit 110/212 towards device 302, or via a separate manual operator initiated switch of user control device 302 into override mode.

Figure 4:
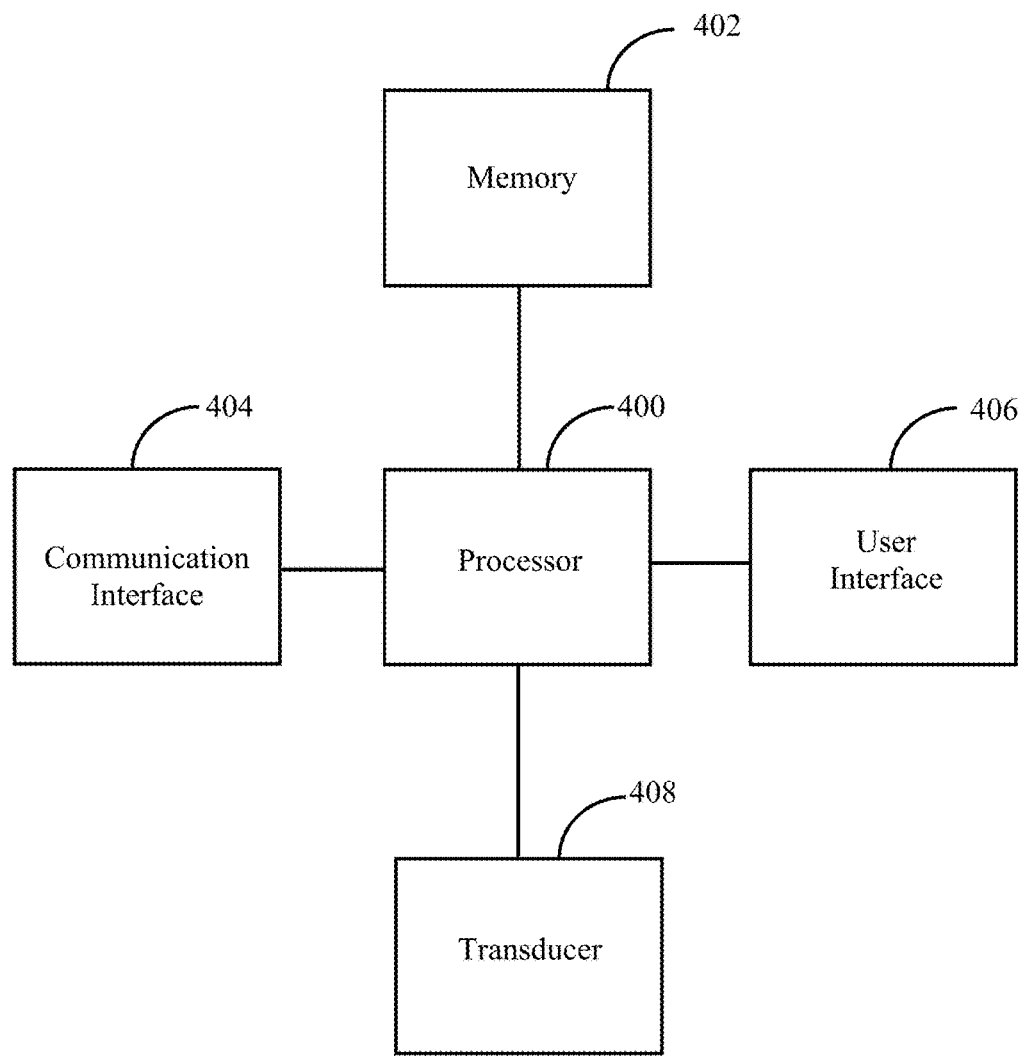
FIG. 4 is a functional block diagram of one embodiment of a user control device as shown in FIGS. 1-3.

FIG. 4 is a functional block diagram of one embodiment of a user control device. Specifically, FIG. 4 shows processor 400, memory 402, communication interface 404, user interface 406, and transducer 408 (in an embodiment where one or more transducers are integrated with a user control device). It should be understood that the functional blocks shown in FIG. 4 may be connected to one another in a variety of ways, and that not all functional blocks necessary for operation of the user control device are shown (such as a power supply) for purposes of clarity.

Processor 400 is configured to provide general operation of the user control device by executing processor-executable instructions stored in memory 402, for example, executable code. Processor 400 is typically a general purpose microprocessor or microcontroller, such as any one of a number of Core i-series class microprocessors manufactured by Intel Corporation of Santa Clara, Calif., chosen based on implementation requirements such as power, speed, size and cost.

Memory 402 comprises one or more information storage devices, such as RAM, ROM, EEPROM, UVPROM, flash memory, SD memory, XD memory, or virtually any other type of electronic memory device. Memory 402 is used to store the processor-executable instructions for operation of the user control device as well as any information used by processor 400 to perform such operations. In one embodiment, one or more operator profiles are stored in memory 402, each operator profile comprising information pertaining to each respective operator of a vessel, such as years of total experience, years of experience with particular vessel types, a date of birth or age of each operator, one or more operator licenses authorizing an operator to operate certain vessel types, etc.

User interface 406 is coupled to processor 400 and allows an operator to enter commands into the user control device and receive information from the user control device. User interface 406 may comprise one or more pushbuttons, switches, sensors, touchscreens, keypads, keyboards, ports, and/or microphones that generate electronic signals for use by processor 400 upon initiation by a user. User interface 406 may additionally comprise one or more visual display devices for display of vessel operating information to an operator.

Communication interface 404 comprises circuitry necessary for processor 400 to communicate with other electronic devices, such as one or more vessel physical control devices, one or more transducers, and/or with central processing unit 110/212, typically over a vessel network, such as an Ethernet, Wi-fi, and/or other data network.

Transducer 408 comprises one or more of a camera, a microphone, a pressure or weight-sensing element, a touch screen, a haptic sensor, a touch sensor, etc., or a combination of these, to provide one or more physical conditions or attributes of an operator in proximity to a user control device.

Figure 5:
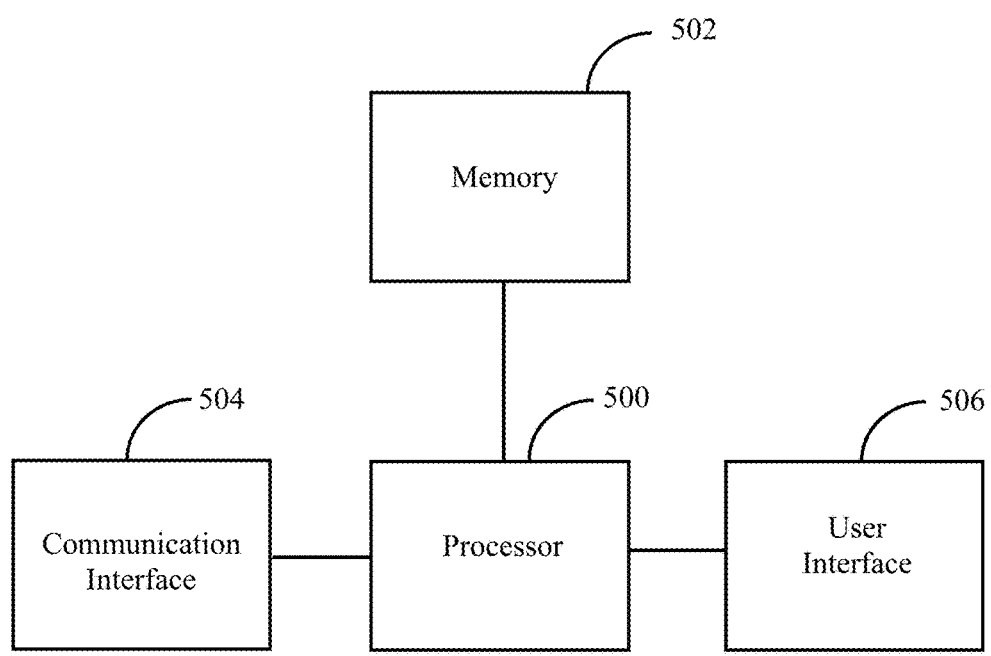
FIG. 5 is a functional block diagram of one embodiment of a central processing unit as shown in FIGS. 1-3.

FIG. 5 is a functional block diagram of one embodiment of central processing unit 110/212. Specifically, FIG. 5 shows processor 500, memory 502, communication interface 504, and user interface 506. It should be understood that the functional blocks shown in FIG. 5 may be connected to one another in a variety of ways, and that not all functional blocks necessary for operation of the user control device are shown (such as a power supply) for purposes of clarity. Central processing unit 110/212 may comprise a network-based computer dedicated to the control and operation of a vessel, or it may comprise functional elements as part of a computer system that governs other actions onboard a vessel, such as lighting controls, HVAC functions, communications, etc.

Processor 500 is configured to provide general operation of central processing unit 110/212 by executing processor-executable instructions stored in memory 502, for example, executable code. Processor 500 is typically a general purpose microprocessor or microcontroller, such as any one of a number of Core i-series class microprocessors manufactured by Intel Corporation of Santa Clara, Calif., chosen based on implementation requirements such as power, speed, size and cost.

Memory 502 comprises one or more information storage devices, such as RAM, ROM, EEPROM, UVPROM, flash memory, SD memory, XD memory, or virtually any other type of electronic memory device. Memory 502 is used to store the processor-executable instructions for operation of central processing unit 110/212 as well as any information used by processor 500 to perform such operations. In one embodiment, one or more operator profiles are stored in memory 502, each operator profile comprising information pertaining to each respective operator of a vessel, such as years of total experience, years of experience with particular vessel types, a date of birth or age of each operator, one or more operator licenses authorizing an operator to operate certain vessel types, etc.

User interface 506 is coupled to processor 500 and allows an operator to maintain central processing unit 110/212, for example to provide software updates, perform troubleshooting, receive operational reports regarding the vessel, etc.

User interface 406 may comprise one or more pushbuttons, switches, sensors, touchscreens, keypads, keyboards, ports, and/or microphones that generate electronic signals for use by processor 500 upon initiation by a user. User interface 506 may additionally comprise one or more visual display devices for display of vessel operating information to a user.

Communication interface 504 comprises circuitry necessary for processor 500 to communicate with other electronic devices, such as one or more vessel physical control devices and one or more user control devices, typically over a vessel network, such as an Ethernet, Wi-fi, and/or other data network. It should be understood that communication interface 504 may comprise circuitry necessary for central processing unit 110/212 to communicate to other devices in more than one protocol or format, such as receiving commands and transducer data over a first communication channel and providing commands to user control devices over a second communication channel, such as the use of UCD control link 308.

Figure 6:
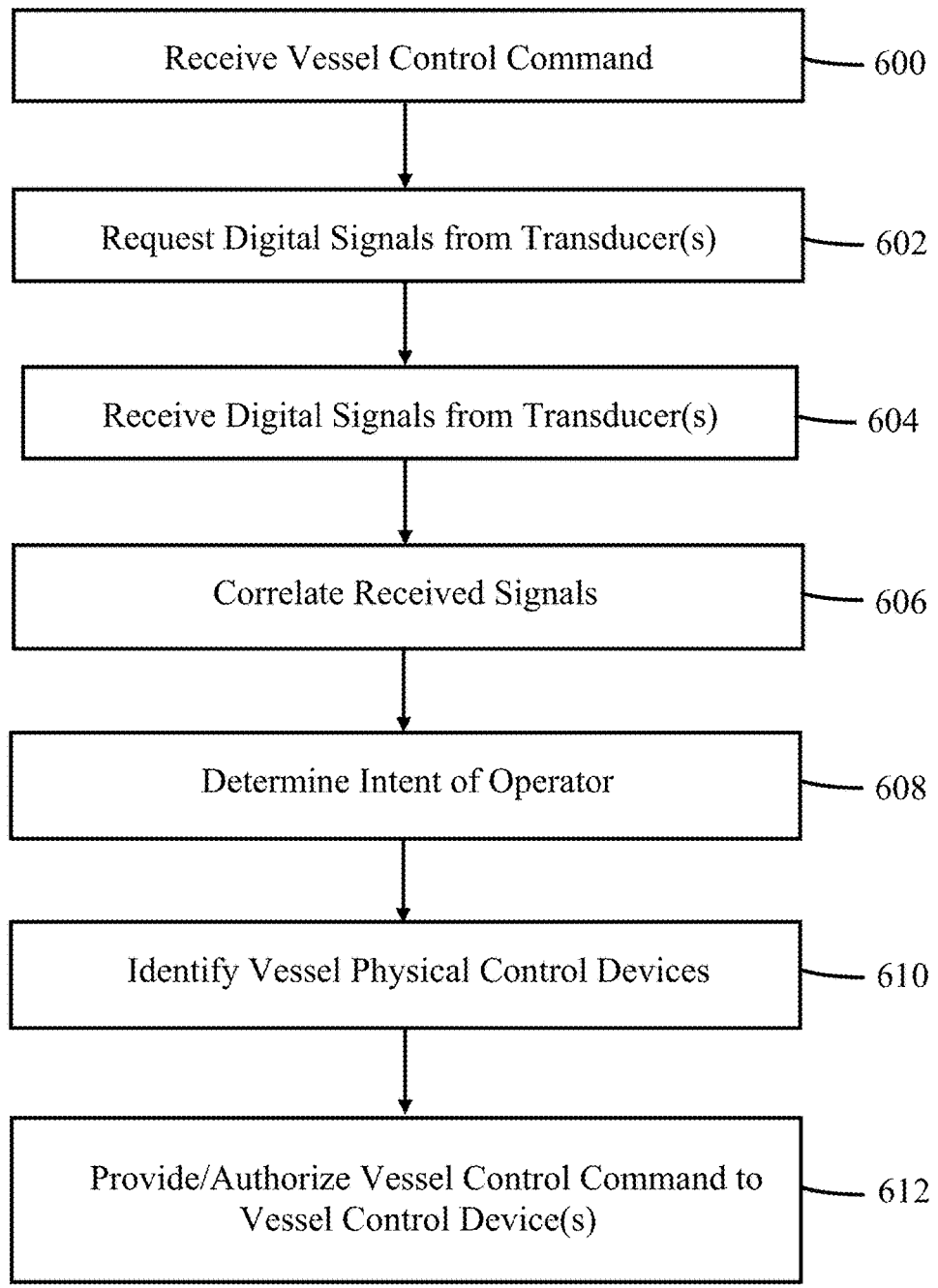
FIG. 6 is a flow diagram illustrating one embodiment of a method executed the central processing unit shown in FIGS. 1-4 for preventing unintentional operation of a water-based vessel.

FIG. 6 is a flow diagram illustrating one embodiment of a method executed by central processing unit 110/212 for preventing unintentional operation of a water-based vessel. It should be understood that while the method described herein relates to operation of central processing unit 110/212, they could also apply to operation of one or more user control devices in a similar manner. It should be understood that the steps described in this method could be performed in an order other than what is shown and discussed, and that minor steps have been omitted for clarity.

At block 600, processor 500 receives a vessel control command via communication interface 504 from a user control device to control operation of a vessel. The command may comprise instructions for operating one or more vessel physical control devices, such as one or more engines, rudders, winches, etc.

At block 602, in response to receiving the command, processor 500 determines one or more transducers that are associated with the particular user control device and sends one or more of these transducers instructions that cause one or more of the transducers to provide digital signals representative of a physical condition or attribute of an area proximate to the particular user control device. For example, processor 500, upon determining that the command originated from, for example, user control device 302, consults memory 502 to determine a list of pre-stored transducers associated with user control device 302. In this example, only transducer 304 is associated with user control device 302, therefore processor 500 sends a command to transducer 304 for transducer 304 to provide digital signals representative of recent physical conditions or attributes of the operator.

At block 604, processor 500 receives one or more digital signals either directly from one or more transducers associated with the user control device that sent the command, or via the user control device that sent the command at block 600. The digital signals may represent a physical condition or attribute of a vessel operator in proximity of a user control device, such as a digital image or video of an area proximate to a user control device, a pressure or activation of one or more switches, audio information, or other physical conditions or attributes of the operator proximate to the user control device.

Each of the vessel control commands from the user control device and the digital signals from the one or more transducers may comprise identification information used by processor 500 to associate a particular user control device with one or more particular transducers. The command from the user control device comprises a digital representation of the user interaction performed. Based on the type of interaction and user control device, this digital representation may be based on a sample at a single point in time, or based on an aggregate set of samples, e.g. by integrating over a period of time or taking a time average. In another example, the digital representations may be based on an operator moving a joystick, entering information into a touchscreen device, operating a throttle, operating a steering wheel or rudder control, etc.

At block 606, in one embodiment, the processor correlates received digital representations by an identity of the user control device that sent the command, and time of transmission, into pairs of operator commands and their associated digital signals from one or more associated transducers.

At block 608, processor 500 determines a degree of intent of the operator to perform the user interaction (i.e., command) received at block 600 by using the digital signals received from one or more transducers at block 604. In one embodiment, processor 500 uses previously stored rules stored in memory 502 to determine whether the attribute value of a specific interaction/intent pair matches or exceeds a minimum threshold for considering the pair valid. It should be understood that the minimum threshold may be a direct comparison of values, or the comparison of statistically derived metrics from attribute data against reference values. The threshold and reference values themselves may vary over time based on other factors determined by the processor. Such digital signals may be based on a sample at a single point in time or based on an aggregate set of samples, e.g. by integrating over a period of time or taking a time average. The time relevant for sampling may be preceding the user interaction (e.g. a precondition verification), concurrent with the user interaction, following the user interaction (e.g. a post-action acknowledgement), or any combination thereof. In general, processor 500 may determine an intent of an operator in one or more ways, as described above with respect to FIGS. 1-3. For example, processor 500 may analyze the digital signals to determine whether an operator is positioned in front of a user interface of the user control device, whether the operator is looking at the user interface, whether the operator's posture indicates an intentional action, (i.e., leaning towards a user interface), whether the operator is gripping a haptic device, whether the operator is standing or sitting in front of the user control device, etc.

At block 610, once an interaction/intent pair is deemed valid by processor 500, or processor 500 otherwise determines that the operator has intended to control the vessel, processor 500 identifies one or more vessel physical control devices subject to the control command received at block 600. Said vessel physical control device(s) may be directly specified as part of the vessel control command, or may be derived by processor 500 based on a more complex command targeting more than one vessel physical control device. Processor 500 optionally further applies a transformation of the vessel control command resulting in a control command readily understood by the target physical control device(s).

At block 612 processor 500 transmits the resulting control command to one or more target vessel physical control devices using a previously agreed upon protocol. In another embodiment, processor 500 transmits an approval message to the user control device that provided the vessel control command at block 600. In response, the user control device provides a control command to one or more target vessel control devices to control operation of the vessel.

The methods or algorithms described in connection with the embodiments disclosed herein may be embodied directly in hardware, in processor-executable instructions executed by a processor, or in a combination of the two. The processor-executable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components.

Accordingly, various embodiments of the ideas presented herein may include a computer readable media embodying a code or processor-readable instructions to implement the methods of operation of the system in accordance with the methods, processes, algorithms, blocks and/or functions disclosed herein.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different components, algorithms and/or logic circuits, perhaps more complex than those described herein, may be used.

Further, it should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

We claim:

1. A method performed by a central processing unit for preventing unintentional operation of a water-based vessel, comprising:

receiving, by a processor via a user control device, a manual vessel control command from a vessel operator in proximity to a user control device, the manual vessel control command for controlling a vessel physical control device;

receiving, by the processor via a transducer, a digital representation of an attribute of the vessel operator in proximity to the user control device;

determining, by the processor, whether the manual vessel control command was intentionally provided to the control device based on the digital representation of the attribute; and providing a command to the vessel physical control device based on the manual vessel control command when the processor determines that the vessel operator has intentionally provided the manual vessel control command to the user control device.

2. The method of claim 1, wherein the transducer comprises a digital camera and the attribute comprises a posture of the vessel operator, wherein determining whether the vessel operator has intentionally provided the manual vessel control command to the control device comprises:

producing a posture approximation of the vessel operator from the digital representation;

comparing the posture approximation to a posture profile stored in a memory; and determining, by the processor, that the posture approximation matches the posture profile based on the comparison.

3. The method of claim 1, wherein the transducer comprises a digital camera and the attribute comprises a position of the vessel operator, wherein determining whether the vessel operator has intentionally provided the manual vessel control command to the control device comprises:

determining, by the processor, based on the digital representation from the digital camera, that the vessel operator is facing the user control device.

4. The method of claim 1, wherein the transducer comprises a digital camera and the attribute comprises a gaze of the vessel operator, wherein determining whether the vessel operator has intentionally provided the manual vessel control command to the control device comprises:

determining, by the processor, based on the digital representation from the digital camera, that the vessel operator is gazing at the control device.

5. The method of claim 1, wherein the transducer comprises a weight sensor disposed on a deck proximate to a location in front of the user control device, and the attribute comprises a weight, wherein determining whether the vessel operator has intentionally provided the manual vessel control command to the control device comprises:

determining, by the processor, based on the digital representation from the weight sensor, that the vessel operator is standing in front of the user control device.

6. The method of claim 1, wherein the control device comprises a joystick and the transducer comprises a touch sensor located on a surface of the joystick, and the attribute comprises a touch of the vessel operator on the touch sensor, wherein determining whether the vessel operator has intentionally provided the manual vessel control command to the control device comprises:

determining, by the processor, based on the digital representation from the touch sensor, that the vessel operator is grasping the joystick.

7. The method of claim 6, wherein the control device comprises a second touch sensor located on an opposing side of the joystick, wherein determining whether the vessel operator has intentionally provided the manual vessel control command to the control device comprises:

determining, by the processor, based on the digital representation from the touch sensor and the second touch sensor, that the vessel operator comprises applying pressure against both the touch sensor and the second touch sensor.

8. A user control device for preventing unintentional operation of a water-based vessel, comprising:

a user interface for receiving a manual vessel control command from a vessel operator to control operation of the vessel;

a memory for storing processor-executable instructions;

a communication interface for providing commands to a physical vessel control device and for receiving a digital representation of a physical condition or attribute of the vessel operator in proximity to the user control device from a transducer; and a processor, coupled to the user interface, the memory and the communication interface for executing the processor-executable instructions that causes the user control device to:

receive, by the processor via the user interface, the manual vessel control command;

receive, by the processor via the communication interface, the digital representation;

determine, by the processor, whether the vessel operator has intentionally provided the manual vessel control command to the user interface based on the digital representation; and provide the manual vessel control command to the vessel physical control device when the processor determines that the vessel operator has intentionally provided the manual vessel control command to the user interface.

9. The user control device of claim 8, wherein the transducer comprises a digital camera and the attribute comprises a posture of the vessel operator, wherein the processor-executable instructions that cause the user control device to determine whether the vessel operator has intentionally provided the manual vessel control command to the user interface comprises instructions that cause the user control device to:

generate, by the processor, a posture approximation of the vessel operator from the digital representation;

compare, by the processor, the posture approximation to a posture profile stored in the memory; and determine, by the processor, that the posture approximation matches the posture profile based on the comparison.

10. The user control device of claim 8, wherein the transducer comprises a digital camera and the attribute comprises a position of the vessel operator, wherein the processor-executable instructions that cause the user control device to determine whether the vessel operator has intentionally provided the manual vessel control command to the user interface comprises instructions that cause the user control device to:

determine, by the processor, based on the digital representation from the digital camera, that the vessel operator is facing the user control device.

11. The user control device of claim 8, wherein the transducer comprises a digital camera and the attribute comprises a gaze of the vessel operator, wherein the processor-executable instructions that cause the user control device to determine whether the vessel operator has intentionally provided the manual vessel control command to the user interface comprises instructions that cause the user control device to:

determine, by the processor, based on the digital representation from the digital camera, that the vessel operator is gazing at the user interface.

12. The user control device of claim 8, wherein the transducer comprises a weight sensor disposed on a deck proximate to a location in front of the user control device, and the attribute comprises a weight, wherein the processor-executable instructions that cause the user control device to determine whether the vessel operator has intentionally provided the manual vessel control command to the user interface comprises instructions that cause the user control device to:

determine, by the processor, based on the digital representation from the weight sensor, that the vessel operator is standing in front of the user control device.

13. The user control device of claim 8, wherein the user interface comprises a joystick and the transducer comprises a touch sensor located on a surface of the joystick, and the attribute comprises a touch of the vessel operator on the touch sensor, wherein the processor-executable instructions that cause the user control device to determine whether the vessel operator has intentionally provided the manual vessel control command to the user interface comprises instructions that cause the user control device to:

determine, by the processor, based on the digital representation from the touch sensor, that the vessel operator is grasping the joystick.

14. The user control device of claim 13, wherein the user interface comprises a second touch sensor located on an opposing side of the joystick, wherein the processor-executable instructions that cause the user control device to determine whether the vessel operator has intentionally provided the manual vessel control command to the user interface comprises instructions that cause the user control device to:

determine, by the processor, based on the digital representation from the touch sensor and the second touch sensor, that the vessel operator comprises applying pressure against both the touch sensor and the second touch sensor.

15. A central processing unit for preventing unintentional operation of a water-based vessel, comprising:

a communication interface for receiving a manual vessel control command from a user control device;

a memory for storing processor-executable instructions; and a processor coupled to the communication interface and the memory, for executing the processor-executable instructions that cause the central processing unit to:

receive a digital representation of a physical condition or attribute of a vessel operator;

determine, by the processor, whether the vessel operator has intentionally provided the manual vessel control command to the user control device based on the digital representation; and provide the manual vessel control command to a physical vessel control device when the processor determines that the vessel operator has intentionally provided the manual vessel control command to the user control device.

16. The central processing unit of claim 15, wherein the digital representations comprise visual information from a camera and the attribute comprises a posture of the vessel operator, wherein the processor-executable instructions that cause the central processing unit to determine whether the vessel operator has intentionally provided the manual vessel control command to the user control device comprises instructions that cause the central processing device to:
- generate, by the processor, a posture approximation of the vessel operator from the digital representation;
- compare, by the processor, the posture approximation to a posture profile stored in the memory; and
- determine, by the processor, that the posture approximation matches the posture profile based on the comparison.

17. The central processing unit of claim 15, wherein the digital representations comprise visual information from a camera and the attribute comprises a position of the vessel operator, wherein the processor-executable instructions that cause the central processing unit to determine whether the vessel operator has intentionally provided the manual vessel control command to the user control device comprises instructions that cause the central processing unit to:
- determine, by the processor, based on the digital representation from the camera, that the vessel operator is facing the user control device.

18. The central processing unit of claim 15, wherein the digital representations comprise visual information from a camera and the attribute comprises a gaze of the vessel operator, wherein the processor-executable instructions that cause the processor to determine whether the vessel operator has intentionally provided the manual vessel control command to the user control device comprises instructions that cause the central processing unit to:
- determine, by the processor, based on the digital representation from the camera, that the vessel operator is gazing at the user control device.

19. The central processing unit of claim 15, wherein the digital representations comprise weight information from a weight sensor and the attribute comprises a weight, wherein the processor-executable instructions that cause the central processing unit to determine whether the vessel operator has intentionally provided the manual vessel control command to the user control device comprises instructions that cause the central processing unit to:
- determine, by the processor, based on the digital representation from the weight sensor, that the vessel operator is standing in front of the user control device.

20. The central processing unit of claim 15, wherein the wherein the user control unit comprises a joystick, and the digital representations comprise a touch of the vessel operator on a touch sensor located on the joystick, and the attribute comprises a grasp, wherein the processor-executable instructions that cause the central processing unit to determine whether the vessel operator has intentionally provided the manual vessel control command to the user control device comprises instructions that cause the central processing unit to:
- determine, by the processor, based on the digital representation from the touch sensor, that the vessel operator is grasping the joystick.

21. The central processing unit of claim 20, wherein the user control device comprises a second touch sensor located on an opposing side of the joystick, wherein the processor-executable instructions that cause the central processing unit to determine whether the vessel operator has intentionally provided the manual vessel control command to the user control device comprises instructions that cause the central processing unit to:
- determine, by the processor, based on the digital representation from the touch sensor and the second touch sensor, that the vessel operator is applying pressure against both the touch sensor and the second touch sensor.

* * * * *